INVENTORS.
RICHARD F. SNYDER
ELIOT S. GERBER

United States Patent Office 3,174,048
Patented Mar. 16, 1965

3,174,048
AUTOMOTIVE BATTERY CHARGING CIRCUITS
Richard F. Snyder, 3 Lockwood Road, Scarsdale, N.Y.,
and Eliot S. Gerber, 15 E. 9th St., New York, N.Y.
Filed May 9, 1961, Ser. No. 108,939
7 Claims. (Cl. 307—10)

This invention relates to energy translation systems for motor vehicles and in particular to energy translation systems for motor vehicles equipped with a mechanically driven alternating current generator to supply energy to charge the vehicular battery. This invention also relates to circuit arrangements to effectively and safely utilize the components necessarily included within such circuits.

In known vehicular A.C. generator-battery charging circuits a rectifier of high current carrying capability, of either the full-wave or half-wave variety, is used to convert the alternating current output of the power driven generator into direct current for charging the storage battery.

A feature of the present invention is the inclusion of a power transformer and a switching circuit in a vehicle so that the battery may be charged from the 110 volt A.C. supply main of a house or garage, without the necessity of using an auxiliary battery charger.

In a second embodiment of the invention, the transformer is switched so that it is connected across the power driven A.C. generator to supply 110 volt A.C. energy to the vehicle to provide a source of 110 volt A.C. energy when the engine is running, for auxiliary purposes such as electric shavers, radios, and other common household 110-volt appliances. As the same transformer is used alternatively for the purposes of charging the battery or supplying auxiliary 110 volt A.C. power, the system is inexpensive and simple to install and requires no maintenance.

A further embodiment of the invention utilizes the transformer either to provide 110 volt A.C. current within the vehicle alone, to charge the battery, or to provide the entire 110 volt A.C. output energy of the alternator to supply, externally of the vehicle, primary emergency power to the household for running a refrigerator or oil heater in case of public utility power failure.

These features of the invention will be specifically described in the description of the preferred embodiments below with reference to the drawings, of which:

Figure 2:
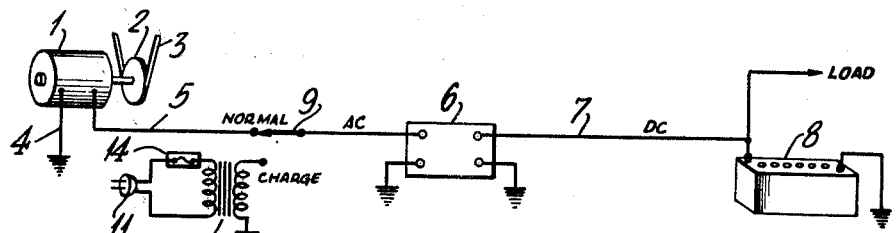
FIG. 2 is a schematic diagram of the first embodiment of the invention for charging the battery from public utility wire mains.
Figure 3:
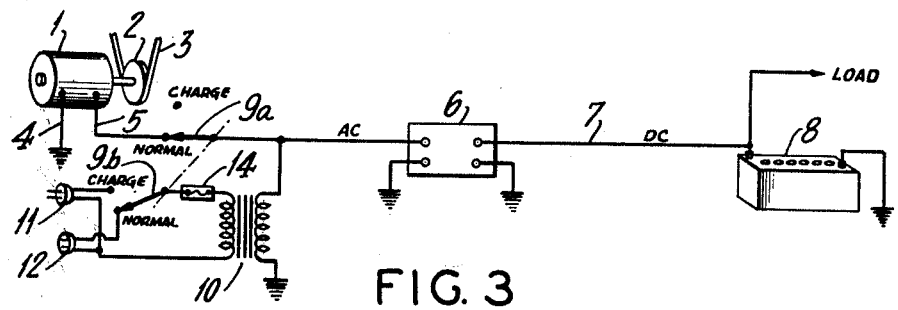
Figure 4:
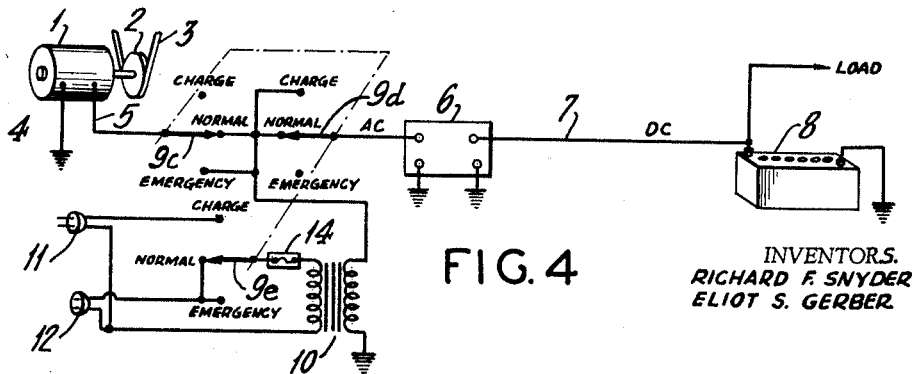

FIG. 3 is a schematic diagram of the second embodiment of the invention in which, in addition to the function illustrated in FIG. 2, during normal vehicle use, 110 volt A.C. energy is supplied to the vehicle for auxiliary functions; and FIG. 4 is a schematic diagram of a third form of the invention which may be used to perform the two previous functions as well as to function as a source of 110 volt A.C. emergency power.

Figure 1:
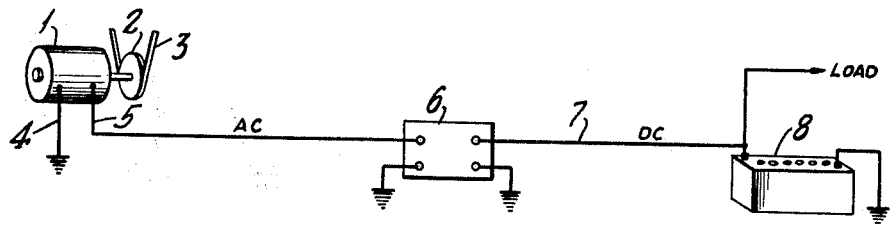
FIG. 1 is a schematic diagram of the conventional vehicle alternator-battery circuit.

In FIG. 1, the normal arrangement is illustrated wherein an A.C. generator 1, having a pulley wheel 2, is positioned to be driven by the belt 3 connected to the engine power output shaft, not illustrated. One of the 12 volt output leads 4 is connected to ground, and the other 5 are connected to the input of the A.C. rectifier 6, usually a silicon diode. The rectified current is conducted to the battery 8 via the wire 7, with the return current flowing through the ground circuit back to generator lead 4.

In FIG. 2, the first embodiment of the present invention, the lead 5 from the generator is broken and a two-position single pole switch 9 is inserted in the circuit with the movable arm being connected to the rectifier 6 input circuit. The transformer 10 having a winding ratio of approximately 10:1 is provided with the primary leads connected to a male electrical receptacle. In this circuit, with the switch in the "normal" position, the circuit is as shown in FIG. 1. When the switch arm is rotated to the "charge" position, and a household "extension" cable connected to the receptacle 11 and the 110 volt A.C. utility mains, about 14 volts of alternating current is fed to the rectifier for battery charging purposes. The transformer ratio was above stated to be approximately 10:1; however, the ratio should be selected to provide the proper voltage to the rectifier to provide a suitable charging current in the battery circuit. This must be adjusted to overcome the rectifier "drop" and any other circuit losses. The charging rate may be adjusted to provide for slow or fast charging with the rate varying from, say, 2 or 20 amperes. If desired, the transformer 10 may be provided with taps connected to an auxiliary tap switch, so the charging rate could thereby be changed to suit the voltage of the utility main and the best charging voltage for the storage battery 8.

FIGS. 3 and 4 show wire lines from the male 12 and female 11 plugs to the 110 volt side of transformer 10. these are the only 110 volt lines in the circuit and protective measures should be taken for the safety of passengers to ensure that these lines do not become bare or worn or in any way short to ground. It is a further feature of the present invention that these 110 volt lines are eliminated by connecting the male and female plugs directly into the transformer leads. In accordance with this feature, the transformer, plugs, fuse hole, and switch are preferably built as a single potted or enclosed unit which is mounted on the back of the car's dashboard, with the female receptacle 12 protruding through the dashboard and the male receptacle 11 and the switch 9 available by reaching under the dashboard.

FIG. 3 illustrates the second embodiment of the present invention wherein a two-pole two-position switch is included in the circuit. In this embodiment, the pole 9a functions as above described. The auxiliary pole 9b is connected in the high voltage winding circuit of the transformer 10 and switches the leads to either a male or female electrical receptacle. In the "charge" position, the transformer high voltage winding is connected to the "male" receptacle to ensure that the operator will receive no electrical shock while connecting the circuit to the utility mains. In the "normal" position the winding is connected to a "female" receptacle which is disposed, preferably, within the cab of the vehicle. This then provides a source of 110 volt A.C. energy, when the engine is running, for the operation of 110 volt appliances within the vehicle.

Since the frequency of this auxiliary voltage fluctuates with alternator speed, it is dependent upon engine speed, and is therefore not reliable for appliances requiring 60 cycle A.C. such as electric clocks, motors or 60 cycle A.C. radios, but it is useful for shavers, appliances using electric heating elements, vibrator driven appliances and A.C.-D.C. radios where the frequency is not critical.

FIG. 4 illustrates the third embodiment of the present invention including both previous embodiments and adding another feature. In this circuit, the switch 9 is a three-pole, three-position switch and provides a third position titled "emergency." With the switch in the "emergency" position and the engine running, the battery charging circuit is disconnected, and the generator output, transformed up to the 110 volt level, is connected to the female receptacle. With the switch in the "emergency" position all possible generator output energy is fed to the receptacle 12. During "emergency" conditions at home, as for instance when the utility mains are knocked out by storm or accident, sufficient 110 volt energy may be generated from the vehicle to power the household refrigerator and oil heater alternately in order to maintain heat and preserve foodstuffs. The embodiment illustrated in FIG. 4 provides an emergency power source from the family car. It would be desirable to include a frequency meter in the circuit of FIGS. 3 and 4 in order that the engine throttle may be adjusted to supply 60-cycle current for the household appliances. It would also be desirable to construct the alternator with the proper number of poles so that at the car's engine idle speed it would produce 60-cycle current.

In each of the forms illustrated in FIGS. 2, 3 and 4, a fuse 14 has been included in the transformer circuit for the usual protective purposes.

Modifications may be made in the described embodiments within the scope of the subjoined claims. One example of such a modification would be to change the transformer ratio to about 5:1 for those alternators which produce 24 volts A.C. current. An example of an additional modification would be to add an additional pole or poles to the control switch for automatic switching of the generator field resistance, to provide optimum field current, in the emergency power generation condition. A further example of a circuit modification deemed to be within the scope of the invention would be where multiple transformer windings were used to simplify the switching circuitry as, for instance, where two high-voltage windings were employed, one for input voltage and one for output voltage, together with one low voltage winding.

We claim:

1. In an engine powered vehicle of the type having a mechanically driven alternator, a rectifier connected to said alternator and a storage battery connected to said rectifier circuit, the improvement comprising a double pole two-position switch, a step-down transformer, a female electrical receptacle and a male electrical receptacle, the low voltage winding of said transformer being connected between the input terminals of said rectifier, one pole of said two-pole switch being arranged to make and break the circuit between said alternator and said rectifier, and the other pole of said switch being arranged to alternately connect the male and female receptacles to the high voltage winding of said transformer for the receipt of and transmission of electrical energy to the circuit.

2. In an engine powered vehicle of the type having a mechanically driven alternator, a rectifier connected to said alternator and a storage battery connected to said rectifier the improvement comprising a triple pole three-position switch, a step-down transformer and a male and female electrical receptacle, said transformer switches and receptacles being arranged; for one position of the switch, to connect the alternator to said rectifier and to the low-voltage winding of said transformer while simultaneously connecting the high-voltage winding of said transformer to the female receptacle; for a second position of the switch, to disconnect said alternator from said rectifier, connect the low-voltage winding of said transformer to said rectifier and connect the high-voltage winding of said transformer to said male receptacle; and for a third position of said switch, to connect said alternator and said transformer low-voltage winding to each other, disconnect said rectifier from said alternator and connect said transformer high-voltage winding to said female receptacle.

3. In a vehicle electrical system having an engine driven alternator, a rectifier electrically connected to the alternator, and a storage battery electrically connected to the rectifier the improvement comprising a step-down transformer having primary high-voltage and secondary low-voltage sides, an outlet receptacle electrically connected to the primary side, an inlet receptacle electrically connected to the primary side and adapted for connection to a source of A.C. auxiliary battery charging power, switching means electrically connected between the alternator and the secondary side, and an electrical connection from the rectifier to secondary side.

4. The system of claim 3 wherein the improvement comprises also a switchable connection between the alternator and the rectifier, whereby the alternator is disconnected from the said auxiliary battery charging power.

5. The system of claim 3 wherein the improvement comprises also a switchable connection between the electrical inlet receptacle and the primary side of the transformer.

6. The system of claim 3 wherein the outlet receptacle, the transformer and the electrical connection between them are physically contiguous, whereby the short electrical connection between the transformer and the outlet receptacle makes high voltage shorts unlikely.

7. An adjunct for automotive battery charging systems of the type having an A.C. generator and an A.C. rectifier to produce D.C. energy to charge the battery, comprising a switch, a two-winding transformer, a high voltage input receptacle and a high voltage output receptacle, said adjunct being adapted to be serially inserted between the generator and said rectifier, said input and output receptacles being alternately interconnected to one winding of said transformer through said switch, said rectifier also being alternately interconnected to the other winding of said transformer or said generator.

References Cited by the Examiner

UNITED STATES PATENTS 1,680,149 8/28 Gould _____ 307—10 X
2,972,057 2/61 Boehmer et al. _____ 307—10

FOREIGN PATENTS 714,791 4/31 France.

LLOYD McCOLLUM, *Primary Examiner.*

MILTON O. HIRSHFIELD, *Examiner.*